United States Patent
Tan et al.

(10) Patent No.: US 8,510,502 B2
(45) Date of Patent: Aug. 13, 2013

(54) DATA WRITING METHOD, AND MEMORY CONTROLLER AND MEMORY STORAGE APPARATUS USING THE SAME

(75) Inventors: Kheng-Chong Tan, Miaoli (TW); Lai-Hock Chua, Miaoli (TW)

(73) Assignee: Phison Electronics Corp., Miaoli (TW)

( * ) Notice: Subject to any disclaimer, the term of this patent is extended or adjusted under 35 U.S.C. 154(b) by 85 days.

(21) Appl. No.: 13/325,071

(22) Filed: Dec. 14, 2011

(65) Prior Publication Data

US 2013/0097362 A1  Apr. 18, 2013

(30) Foreign Application Priority Data

Oct. 12, 2011  (TW) .............................. 100136991 A

(51) Int. Cl.
*G06F 12/00* (2006.01)
(52) U.S. Cl.
USPC .......................................................... 711/103
(58) Field of Classification Search
None
See application file for complete search history.

(56) References Cited

U.S. PATENT DOCUMENTS

| | | | |
|---|---|---|---|
| 2009/0198875 A1* | 8/2009 | Chu et al. | 711/103 |
| 2010/0042774 A1* | 2/2010 | Yang et al. | 711/103 |
| 2010/0088540 A1* | 4/2010 | Chu et al. | 714/5 |
| 2010/0241789 A1* | 9/2010 | Chu et al. | 711/103 |

* cited by examiner

*Primary Examiner* — Hiep Nguyen
(74) *Attorney, Agent, or Firm* — Jianq Chyun IP Office

(57) ABSTRACT

A data writing method, a memory controller using the method, and a memory storage apparatus using the method are provided. The method includes selecting a physical block as a reserved physical block for a plurality of updated physical blocks. The method also includes, when a host system is about to write updated data into a logical page belonging to a logical block and a physical page, which corresponds to the logical page, of a substitute physical block, which corresponds to an updated physical block mapped to the logical block, has stored data, independently assigning the reserved physical block to the updated physical block mapped to the logical block and writing the updated data into the reserved physical block. Accordingly, the method can complete data writing without performing a data merge operation, thereby shortening the time for performing a write command.

24 Claims, 13 Drawing Sheets

DATA WRITING METHOD, AND MEMORY CONTROLLER AND MEMORY STORAGE APPARATUS USING THE SAME

CROSS-REFERENCE TO RELATED APPLICATION

This application claims the priority benefit of Taiwan application serial no. 100136991, filed on Oct. 12, 2011. The entirety of the above-mentioned patent application is hereby incorporated by reference herein and made a part of this specification.

BACKGROUND OF THE INVENTION

1. Technology Field

The present invention relates to a data writing method. More particularly, the present invention relates to a data writing method for a rewritable non-volatile memory module, and a memory controller and a memory storage apparatus using the same.

2. Description of Related Art

Along with the widespread of digital cameras, cell phones, and MP3 in recently years, the consumers' demand to storage media has increased drastically. Since a rewritable non-volatile memory is characterized by non-volatility of data, low power consumption, small volume, non-mechanical structure, and fast reading and writing speed, the rewritable non-volatile memory is the most adaptable memory to be applied in a portable electronic product, e.g., a notebook computer. A solid state drive (SSD) is a storage apparatus which utilizes a flash memory as its storage medium. Therefore, the flash memory industry has become a very popular part of the electronic industry in recent years.

A flash memory storage system has a plurality of physical blocks, and each of the physical blocks has a plurality of physical pages, wherein data must be written orderly into the physical blocks according to the sequence of the physical pages in the physical blocks. In addition, a physical page containing data has to be erased before it is used for a new data writing operation. Particularly, each physical block is the smallest erasing unit, and each physical page is the smallest programming (i.e., writing) unit. Therefore, in the management of the flash memory storage system, the physical blocks are grouped into a data area and a spare area.

The physical blocks of the data area are used for storing data written by a host system. To be more specific, a control circuit converts a logical access address accessed by the host system into a logical page of a logical block and maps the logical pages of the logical blocks to physical pages of the physical blocks of the data area. Namely, in the management of a flash memory module, the physical blocks of the data area are deemed used physical blocks (e.g., the physical blocks already contain data written by the host system). For instance, the control circuit records the mapping relationship between the logical blocks and the physical blocks of the data area in a logical block-physical block mapping table, and the logical pages of each logical block are sequentially mapped to the physical pages of the corresponding physical block.

Physical blocks in the spare area are used for substituting the physical blocks of the data area. In particular, as described above, a physical block already containing data has to be erased before it is used for a new data writing operation, and thus the physical blocks in the spare area are used for writing updated data to substitute the physical blocks originally mapped to the logical blocks. Hence, the physical blocks in the spare area are either blank blocks or available blocks (i.e., these blocks do not contain data, or these blocks contain data marked as invalid data).

The physical blocks of the data area and the spare area are alternated to store data written by the host system. To allow the host system to properly access the physical blocks that store data in an alternate mechanism, the flash memory storage system provides logical blocks and transforms the logical access addresses accessed by the host system into the logical pages of the corresponding logical blocks. Specifically, the flash memory storage system may transform a logical access address accessed by the host system into a corresponding logical block and record and update a mapping relationship between the logical blocks and the physical blocks of the data area in a logical block-physical block mapping table to reflect the alternation of the physical blocks. Thus, the host system simply accesses data based on the logical access addresses, while the flash memory storage system reads data from or writes data into the mapped physical block according to the logical block-physical block mapping table.

In particular, when the host system is about to store new data into a logical access address, a control circuit of the flash memory storage system identifies a logical block corresponding to the logical access address, selects a physical block from the spare area, and writes the new data into the selected physical block (i.e., also referred to as "a child physical block" or "a substitute physical block") to replace a physical block (also referred to as "a mother physical block") originally mapped to the logical block. Here, the operation of mapping one logical block to a mother physical block and a child physical block is referred to as "opening mother-child blocks", and one mother physical block and one child physical block that map to the same logical block are collectively referred to as a mother-child block set. Generally, the number of physical blocks in the spare area is limited. Accordingly, in a flash memory storage system, the number of the mother-child block sets is limited as well. For instance, the flash memory storage system may simultaneously open three mother-child block sets at most. Afterward, when the host system is about to write data into another logical block, the flash memory storage system must perform a data merge operation to merge valid data of the mother-child block set mapped to a logical block (i.e., the data belonging to this logical block is merged into one physical block).

When the capacity of one logical block is designed to become greater, and the host system frequently just updates data stored in a portion of logical pages of the logical block, the flash memory storage system needs to spend more time to perform the above-mentioned data merge operation for executing the next write command. Therefore, the time of executing the write command is delayed, and the performance of the flash memory storage system is decreased. As a result, how to effectively write data for shortening the time required for executing a write command is one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY OF THE INVENTION

The present invention provides a data writing method, a memory controller, and a memory storage apparatus capable of effectively shortening the time for executing a write command.

According to an exemplary embodiment of the present invention, a data writing method for a rewritable non-volatile memory module is provided, wherein the rewritable non-volatile memory module has a plurality of physical blocks, each of the physical blocks has a plurality of physical pages, the physical blocks are grouped into at least a data area and a spare area, a plurality of logical blocks are configured for mapping the physical blocks belonging to the data area, each of the logical blocks has a plurality of logical pages, and a plurality of physical blocks are respectively selected from the spare area as a plurality of substitute physical blocks corresponding to a plurality of updated physical blocks among the physical blocks belonging to the data area. The data writing method includes selecting at least one physical block from the spare area as a reserved physical block for the updated physical blocks. The data writing method also includes receiving a write command and updated data corresponding to the write command from a host system, wherein the write command indicates writing the updated data starting from a first logical page among the logical pages, the first logical page belongs to a first logical block among the logical blocks, and the first logical block maps to a first updated physical block among the updated physical blocks. The data writing method further includes determining whether a first substitute physical block among the substitute physical blocks stores data belonging to the first logical page, wherein the first substitute physical block corresponds to the first updated physical block. The data writing method further includes, when the first substitute physical block stores the data belonging to the first logical page, independently assigning the reserved physical block to the first updated physical block and writing the updated data into the reserved physical block, wherein the reserved physical block merely stores data belonging to the same logical block.

According to another exemplary embodiment of the present invention, a data writing method for a rewritable non-volatile memory module is provided, wherein the rewritable non-volatile memory module has a plurality of physical blocks, each of the physical blocks has a plurality of physical pages, the physical blocks are grouped into at least a data area and a spare area, a plurality of logical blocks are configured for mapping to the physical blocks belonging to the data area, each of the logical blocks has a plurality of logical pages, and a plurality of physical blocks are respectively selected from the spare area as a plurality of substitute physical blocks corresponding to a plurality of updated physical blocks among the physical blocks belonging to the data area. The data writing method includes selecting at least one physical block from the spare area as a reserved physical block for the updated physical blocks. The data writing method also includes receiving a write command and updated data corresponding to the write command from a host system, wherein the write command indicates writing the updated data starting from a first logical page among the logical pages, the first logical page belongs to a first logical block among the logical blocks, and the first logical block maps to a first updated physical block among the updated physical blocks. The data writing method further includes determining whether the first logical page is a start logical page of the first logical block. The data writing method further includes, when the first logical page is the start logical page of the first logical block, determining whether the size of the updated data is equal to the capacity of one physical block. The data writing method further includes, when the size of the updated data is equal to the capacity of one physical block, independently assigning the reserved physical block to the first updated physical block and writing the updated data into the reserved physical block, wherein the reserved physical block merely stores data belonging to the same logical block.

According to another exemplary embodiment of the present invention, a memory controller for controlling a rewritable non-volatile memory module is provided, wherein the rewritable non-volatile memory module has a plurality of physical blocks and each of the physical blocks has a plurality of physical pages. The memory controller includes a host interface, a memory interface, and a memory management circuit, wherein the host interface is configured for coupling to a host system, the memory interface is configured for coupling to the rewritable non-volatile memory module, and the memory management circuit is coupled to the host interface and the memory interface. Besides, the memory management circuit is configured to group the physical blocks into at least a data area and a spare area. Here, the memory management circuit configures a plurality of logical blocks for mapping the physical blocks belonging to the data area, and each of the logical blocks includes a plurality of logical pages. The memory management circuit respectively selects a plurality of physical blocks from the spare area as a plurality of substitute physical blocks corresponding to a plurality of updated physical blocks among the physical blocks belonging to the data area, and the memory management circuit selects at least one physical block from the spare area as a reserved physical block for the updated physical blocks. Besides, the memory management circuit receives a write command and updated data corresponding to the write command from the host system, wherein the write command indicates writing the updated data starting from a first logical page among the logical pages, the first logical page belongs to a first logical block among the logical blocks, and the first logical block maps to a first updated physical block among the updated physical blocks. Furthermore, the memory management circuit determines whether a first substitute physical block among the substitute physical blocks stores data belonging to the first logical page, wherein the first substitute physical block corresponds to the first updated physical block. When the first substitute physical block stores the data belonging to the first logical page, the memory management circuit independently assigns the reserved physical block to the first updated physical block and writes the updated data into the reserved physical block, wherein the reserved physical block merely stores data belonging to the same logical block.

According to another exemplary embodiment of the present invention, a memory controller for controlling a rewritable non-volatile memory module is provided, wherein the rewritable non-volatile memory module has a plurality of physical blocks and each of the physical blocks has a plurality of physical pages. The memory controller includes a host interface, a memory interface, and a memory management circuit, wherein the host interface is configured for coupling to a host system, the memory interface is configured for coupling to the rewritable non-volatile memory module, and the memory management circuit is coupled to the host interface and the memory interface. The memory management circuit is configured to group the physical blocks into at least a data area and a spare area. Additionally, the memory management circuit configures a plurality of logical blocks for mapping the physical blocks belonging to the data area, wherein each of the logical blocks includes a plurality of logical pages. The memory management circuit respectively selects a plurality of physical blocks from the spare area as a plurality of substitute physical blocks corresponding to a plurality of updated physical blocks among the physical blocks belonging to the data area, and the memory management circuit selects at least one physical block from the spare area as a reserved physical block for the updated physical blocks. Besides, the memory management circuit receives a write command and updated data corresponding to the write command from the host system, wherein the write command indicates writing the updated data starting from a first logical page among the logical pages, the first logical page belongs to a first logical block among the logical blocks, and the first logical block maps to a first updated physical block among the updated physical blocks. The memory management circuit determines whether a first substitute physical block among the substitute physical blocks stores data belonging to the first logical page, wherein the first substitute physical block corresponds to the first updated physical block. When the first substitute physical block stores the data belonging to the first logical page, the memory management circuit is further configured for determining whether the first logical page is a start logical page of the first logical block. When the first logical page is the start logical page of the first logical block, the memory management circuit is further configured for determining whether the size of the updated data is equal to the capacity of one physical block. When the size of the updated data is equal to the capacity of one physical block, the memory management circuit independently assigns the reserved physical block to the first updated physical block and writes the updated data into the reserved physical block, wherein the reserved physical block merely stores data belonging to the same logical block.

According to another exemplary embodiment of the present invention, a memory storage apparatus including a connector, a rewritable non-volatile memory module, and a memory controller is provided. The connector is configured for coupling to the host system. The rewritable non-volatile memory module includes a plurality of physical blocks, and each of the physical blocks has a plurality of physical pages. The memory controller is coupled to the connector and the rewritable non-volatile memory module, and configured to group the physical blocks into at least a data area and a spare area and configure a plurality of logical blocks for mapping the physical blocks belonging to the data area, wherein each of the logical blocks includes a plurality of logical pages. Besides, the memory controller respectively selects a plurality of physical blocks from the spare area as a plurality of substitute physical blocks corresponding to a plurality of updated physical blocks among the physical blocks belonging to the data area, and the memory controller selects at least one physical block from the spare area as a reserved physical block for the updated physical blocks. The memory controller receives a write command and updated data corresponding to the write command from the host system, wherein the write command indicates writing the updated data starting from a first logical page among the logical pages, the first logical page belongs to a first logical block among the logical blocks, and the first logical block maps to a first updated physical block among the updated physical blocks. The memory controller determines whether a first substitute physical block among the substitute physical blocks stores data belonging to the first logical page, wherein the first substitute physical block corresponds to the first updated physical block. When the first substitute physical block stores the data belonging to the first logical page, the memory controller independently assigns the reserved physical block to the first updated physical block and writes the updated data into the reserved physical block, wherein the reserved physical block merely stores data belonging to the same logical block.

According to an exemplary embodiment of the present invention, a memory storage apparatus that including a connector, a rewritable non-volatile memory module, and a memory controller is provided. The connector is configured for coupling to the host system. The rewritable non-volatile memory module includes a plurality of physical blocks, and each of the physical blocks has a plurality of physical pages. The memory controller is coupled to the connector and the rewritable non-volatile memory module, and configured to group the physical blocks into at least a data area and a spare area and configure a plurality of logical blocks for mapping the physical blocks belonging to the data area, wherein each of the logical blocks includes a plurality of logical pages. Additionally, the memory controller respectively selects a plurality of physical blocks from the spare area as a plurality of substitute physical blocks corresponding to a plurality of updated physical blocks among the physical blocks belonging to the data area, and the memory controller selects at least one of the physical blocks from the spare area as a reserved physical block for the updated physical blocks. The memory controller receives a write command and updated data corresponding to the write command from the host system, wherein the write command indicates writing the updated data starting from a first logical page among the logical pages, the first logical page belongs to a first logical block among the logical blocks, and the first logical block maps to a first updated physical block among the updated physical blocks. The memory controller determines whether a first substitute physical block among the substitute physical blocks stores data belonging to the first logical page, wherein the first substitute physical block corresponds to the first updated physical block. When the first substitute physical block stores the data belonging to the first logical page, the memory controller further determines whether the first logical page is a start logical page belonging to the first logical block. When the first logical page is the start logical page belonging to the first logical block, the memory controller further determines whether the size of the updated data is equal to the capacity of one physical block. When the size of the updated data is equal to the capacity of one physical block, the memory controller independently assigns the reserved physical block to the first updated physical block and writes the updated data into the reserved physical block, wherein the reserved physical block merely stores data belonging to the same logical block.

Based on the above, in the data writing method, the memory controller, and the memory storage apparatus described in the exemplary embodiments of the present invention, the data merge operation may be avoided while the write command is being executed, and thereby the time required for executing the write command may be shortened.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

BRIEF DESCRIPTION OF THE DRAWINGS

The accompanying drawings constituting a part of this specification are incorporated herein to provide a further understanding of the present invention. Here, the drawings illustrate embodiments of the present invention and, together with the description, serve to explain the principles of the present invention.

DESCRIPTION OF THE EMBODIMENTS

Figure 1A:
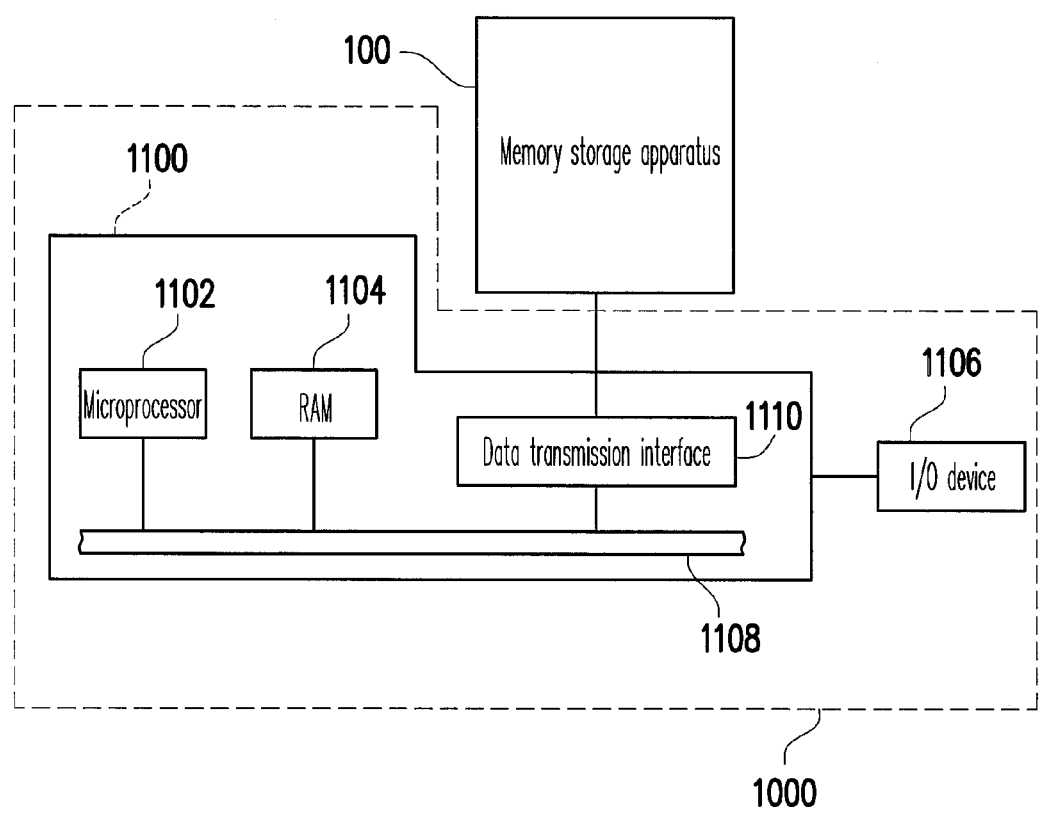
FIG. 1A illustrates a host system and a memory storage apparatus according to a first exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

A memory storage apparatus (i.e., a memory storage system) typically includes a rewritable non-volatile memory module and a controller (i.e., a control circuit). The memory storage apparatus is usually used together with a host system, such that the host system can write data into or read data from the memory storage apparatus.

FIG. 1A illustrates a host system and a memory storage apparatus according to a first exemplary embodiment of the present invention.

Figure 1B:
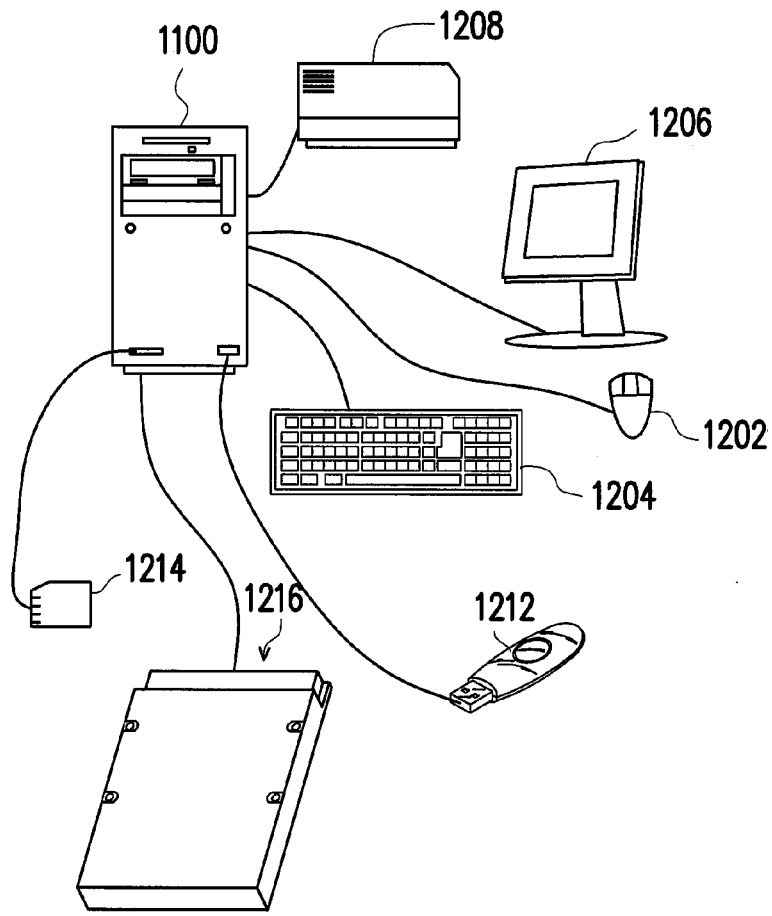
FIG. 1B schematically illustrates a computer, an input/output (I/O) device, and a memory storage apparatus according to the first exemplary embodiment of the present invention.

With reference to FIG. 1A, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208 as shown in FIG. 1B. It should be understood that the I/O device 1106 is not limited to the devices illustrated in FIG. 1B and may further include other devices.

In the exemplary embodiment of the present invention, the memory storage apparatus 100 is coupled to other devices of the host system 1000 through the data transmission interface 1110. By using the microprocessor 1102, the RAM 1104, and the I/O device 1106, the data can be written into or read from the memory storage apparatus 100. For instance, the memory storage apparatus 100 may be a rewritable non-volatile memory storage apparatus, such as a flash drive 1212, a memory card 1214, or a solid state drive (SSD) 1216 as shown in FIG. 1B.

Figure 1C:
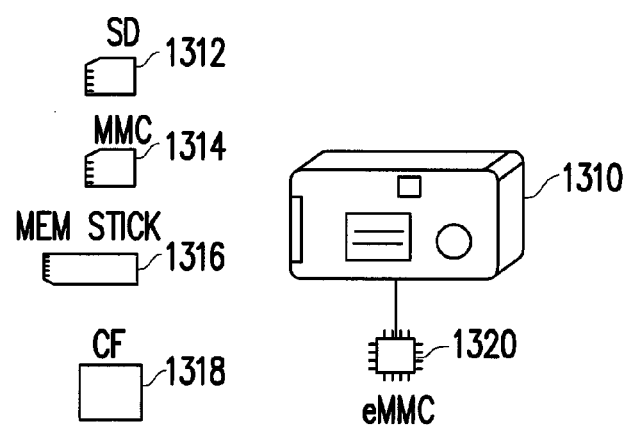
FIG. 1C schematically illustrates a host system and a memory storage apparatus according to another exemplary embodiment of the present invention.

Generally, the host system 1000 can substantially be any system used together with the memory storage apparatus 100 for storing data. Even though the host system 1000 is described as a computer system in the present exemplary embodiment, the host system 1000 in another exemplary embodiment may be a digital camera, a video camera, a communication device, an audio player, a video player, and so forth. For instance, if the host system is a digital camera (video camera) 1310, the rewritable non-volatile memory storage apparatus is an SD card 1312, an MMC 1314, a memory stick 1316, a CF card 1318, or an embedded storage apparatus 1320 (as shown in FIG. 1C). The embedded storage device 1320 includes an embedded MMC (eMMC). It should be mentioned that the eMMC is directly coupled to the substrate of the host system.

Figure 2:
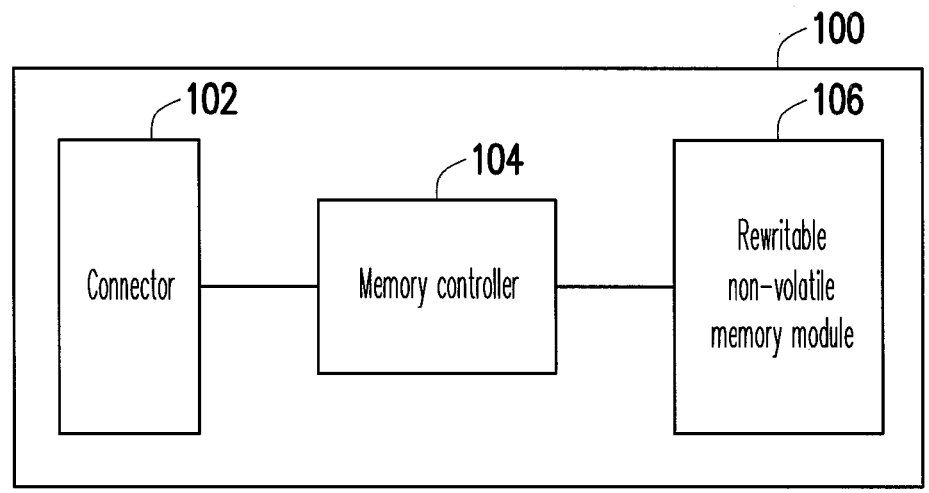
FIG. 2 is a schematic block diagram illustrating the memory storage apparatus depicted in FIG. 1A.

FIG. 2 is a schematic block diagram illustrating the memory storage apparatus depicted in FIG. 1A.

With reference to FIG. 2, the memory storage apparatus 100 includes a connector 102, a memory controller 104, and a rewritable non-volatile memory module 106.

In the present exemplary embodiment, the connector 102 complies with a secure digital (SD) interface standard. However, the present invention is not limited thereto, and the connector 102 may also comply with the Institute of Electrical and Electronic Engineers (IEEE) 1394 standard, the parallel advanced technology attachment (PATA) standard, the peripheral component interconnect (PCI) express standard, the universal serial bus (USB) standard, the serial advanced technology attachment (SATA) standard, the memory stick (MS) standard, the multi media card (MMC) standard, the compact flash (CF) standard, the integrated device electronics (IDE) standard, or other suitable standards.

The memory controller 104 is configured for executing a plurality of logic gates or control instructions implemented in a form of hardware or firmware and performing various data operations in the rewritable non-volatile memory module 106 according to commands issued by the host system 1000, such as data writing, reading, erasing, merging, and so on.

The rewritable non-volatile memory module 106 is coupled to the memory controller 104 and has a plurality of physical blocks for storing data written by the host system 1000. According to this exemplary embodiment, each of the physical blocks has a plurality of physical pages, and the physical pages belonging to the same physical block can be written individually and must be erased simultaneously. For instance, in this exemplary embodiment, each of the physical blocks is constituted by 128 physical pages, and the capacity of each of the physical pages is 8 KB. Nevertheless, it should be understood that the present invention is not limited thereto.

In detail, each of the physical blocks is the smallest unit for erasing data. Namely, each of the physical blocks contains the least number of memory cells that are erased all together. Each of physical pages is the smallest unit for programming data. That is to say, each of the physical pages is the smallest unit for updating data. However, it should be understood that in another exemplary embodiment, the smallest unit for updating data may be one sector or other size. Each physical page usually includes a data bit area and a redundant bit area. The data bit area is used for storing user data, and the redundant bit area is used for storing system data (e.g., error checking and correcting (ECC) codes).

In the present exemplary embodiment, the rewritable non-volatile memory module 106 is a multi level cell (MLC) NAND flash memory module. However, the present invention is not limited thereto, and the rewritable non-volatile memory module 106 may also be a single level cell (SLC) NAND flash memory module, other flash memory module or other memory module having the same characteristic.

Figure 3:
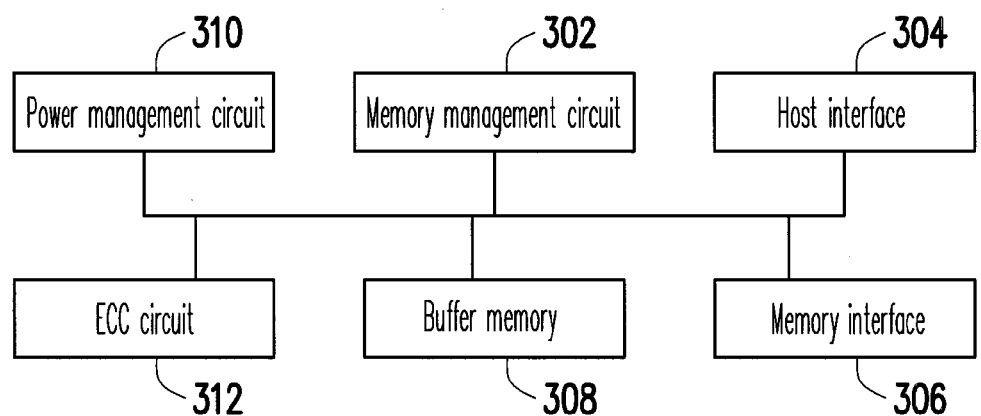
FIG. 3 is a schematic block diagram illustrating a memory controller according to the first exemplary embodiment of the present invention.

FIG. 3 is a schematic block diagram illustrating a memory controller according to the first exemplary embodiment of the present invention. It should be understood that the memory controller depicted in FIG. 3 is merely exemplary and should not be construed as a limitation to the present invention.

With reference to FIG. 3, the memory controller 104 includes a memory management circuit 302, a host interface 304, a memory interface 306, a buffer memory 308, a power management circuit 310, and an error checking and correcting (ECC) circuit 312.

The memory management circuit 302 is configured for controlling the overall operation of the memory controller 104. Particularly, the memory management circuit 302 has a plurality of control instructions, and the control instructions are executed to perform a data writing operation, a data reading operation, a data erasing operation and so on when the memory storage apparatus 100 is operated.

In the present exemplary embodiment, the control instructions of the memory management circuit 302 are implemented in a firmware form. For instance, the memory management circuit 302 has a microprocessor unit (not shown) and a read-only memory (ROM, not shown), and the control instructions are burnt into the ROM. When the memory storage apparatus 100 is operated, the control instructions are executed by the microprocessor unit to write, read, and erase data.

In another exemplary embodiment of the present invention, the control instructions of the memory management circuit 302 are stored in a specific area (for instance, the system area of the memory module exclusively used for storing system data) of the rewritable non-volatile memory module 106 as program codes. Additionally, the memory management circuit 302 may have a microprocessor unit (not shown), a read-only memory (not shown) and a random access memory (not shown). In particular, the ROM has boot codes, and when the memory controller 104 is enabled, the microprocessor unit first executes the boot codes to load the control instructions from the rewritable non-volatile memory module 106 into the RAM of the memory management circuit 302. The microprocessor unit then executes the control instructions to write, read, and erase data.

Additionally, the control instructions of the memory management circuit 302 may also be implemented in a hardware form according to another exemplary embodiment of the present invention. For instance, the memory management circuit 302 includes a microcontroller, a memory management unit, a memory writing unit, a memory reading unit, a memory erasing unit, and a data processing unit. The memory management unit, the memory writing unit, the memory reading unit, the memory erasing unit, and the data processing unit are coupled to the microcontroller. The memory management unit is configured for managing the physical blocks in the rewritable non-volatile memory module 106. The memory writing unit is configured for giving a write command to the rewritable non-volatile memory module 106, so as to write data into the rewritable non-volatile memory module 106. The memory reading unit is configured for giving a read command to the rewritable non-volatile memory module 106, so as to read data from the rewritable non-volatile memory module 106. The memory erasing unit is configured for giving an erase command to the rewritable non-volatile memory module 106, so as to erase data from the rewritable non-volatile memory module 106. The data processing unit is configured for processing data to be written into the rewritable non-volatile memory module 106 and data read from the rewritable non-volatile memory module 106.

The host interface 304 is coupled to the memory management circuit 302 and configured for receiving and identifying commands and data transmitted by the host system 1000. In the present exemplary embodiment, the host interface 304 complies with the SD standard. However, the present invention is not limited thereto, and the host interface 304 may also comply with the PATA standard, the IEEE 1394 standard, the PCI Express standard, the USB standard, the SATA standard, the MS standard, the MMC standard, the CF standard, the IDE standard, or any other appropriate data transmission standard.

The memory interface 306 is coupled to the memory management circuit 302 and configured to access the rewritable non-volatile memory module 106. Namely, data to be written into the rewritable non-volatile memory module 106 is converted by the memory interface 306 into a format acceptable to the rewritable non-volatile memory module 106.

The buffer memory 308 is coupled to the memory management circuit 302 and configured to temporarily store data and commands received from the host system 1000 or data received from the rewritable non-volatile memory module 106. For instance, the buffer memory 302 may be a static random access memory (SRAM), a dynamic random access memory (DRAM), and so forth.

The power management circuit 310 is coupled to the memory management circuit 302 and configured for controlling the power of the memory storage apparatus 100.

The ECC circuit 312 is coupled to the memory management circuit 302 and configured for executing an error correcting procedure to ensure data accuracy. Specifically, when the host interface 304 receives a write command from the host system 1000, the ECC circuit 212 generates an error checking and correcting (ECC) code for data (i.e., the updated data) corresponding to the write command, and the memory management circuit 302 writes the updated data and the corresponding ECC code into the rewritable non-volatile memory module 106. Subsequently, when the memory management circuit 302 reads the data from the rewritable non-volatile memory module 106, the memory management circuit 302 simultaneously reads the ECC code corresponding to the read data, and the ECC circuit 312 executes the error correcting procedure for the read data based on the ECC code.

Figure 4A:
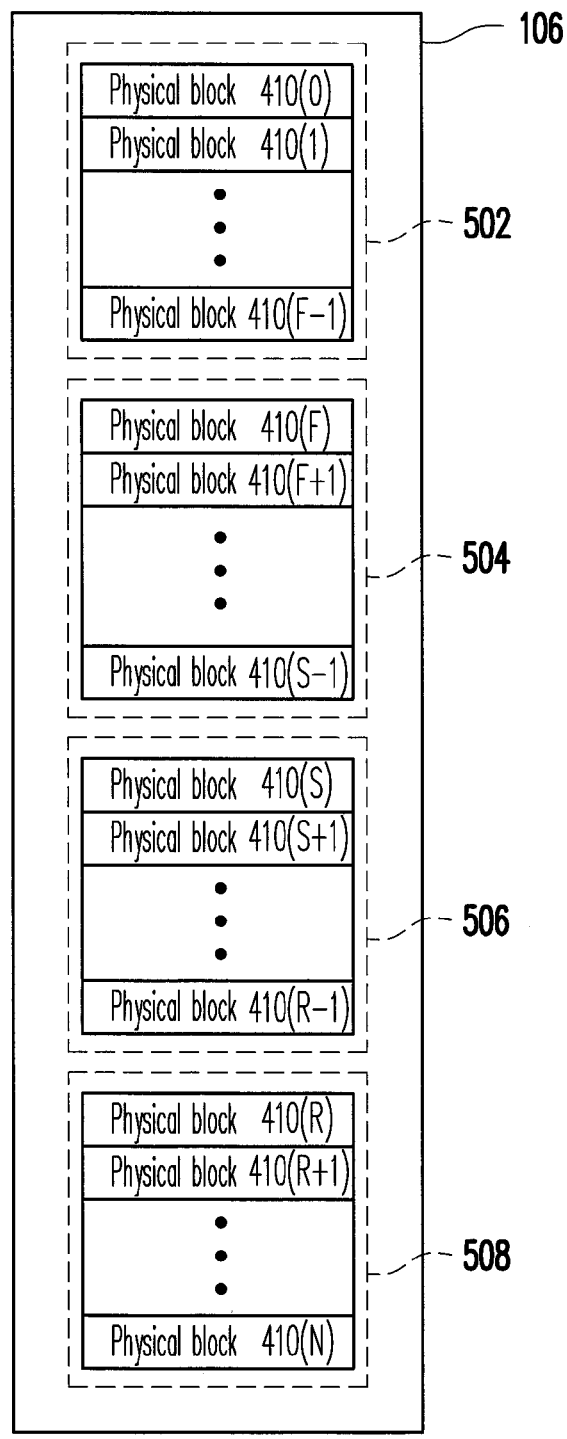
FIG. 4A and FIG. 4B are schematic diagrams of managing physical blocks in a rewritable non-volatile memory module according to the first exemplary embodiment of the present invention.
Figure 4B:
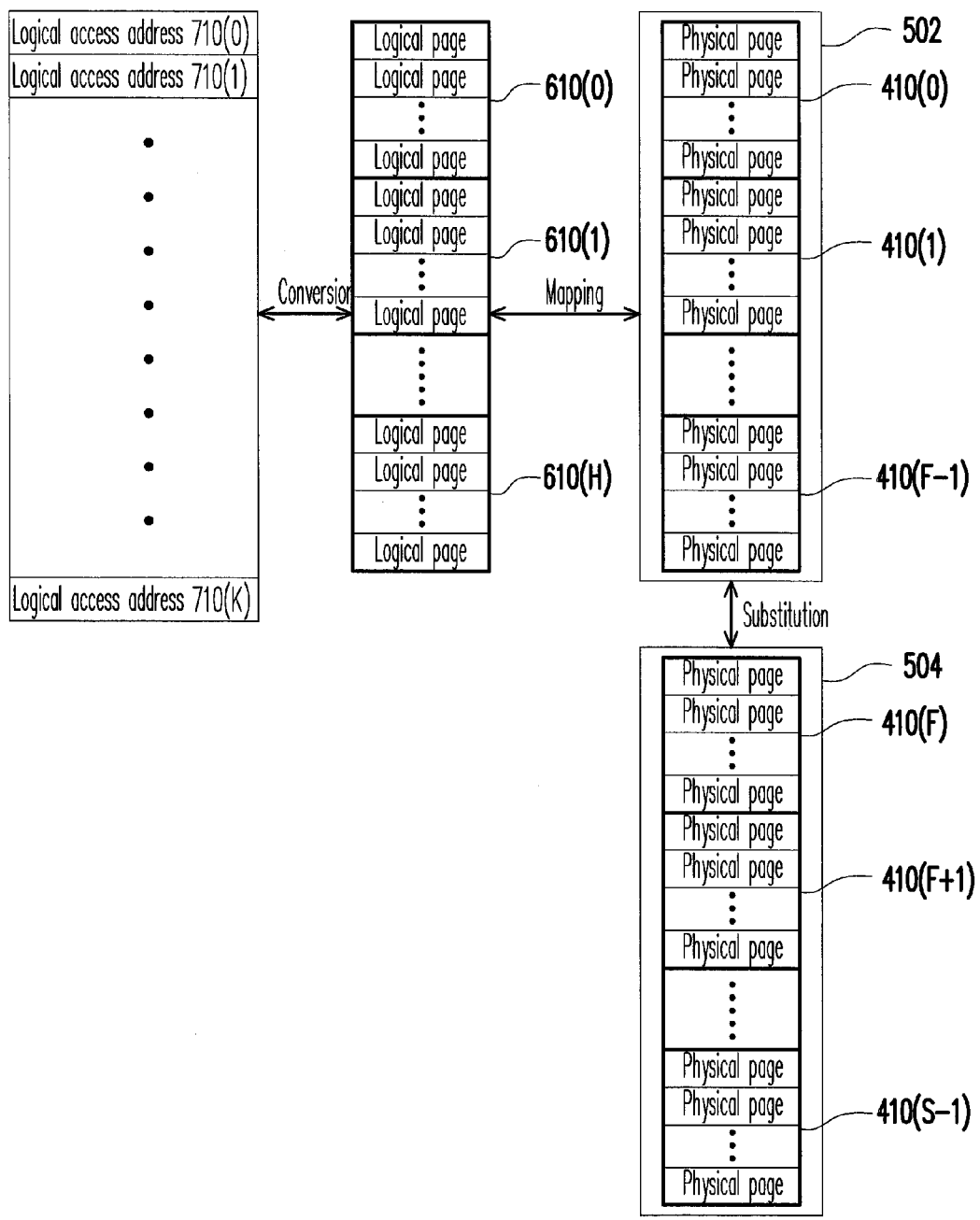

FIG. 4A and FIG. 4B are schematic diagrams of managing physical blocks in a rewritable non-volatile memory module according to the first exemplary embodiment of the present invention.

With reference to FIG. 4A, the rewritable non-volatile memory module 106 has physical blocks 410(0)~410(N), and the memory management circuit 302 of the memory controller 104 logically groups the physical blocks 410(0)~410(N) into (or assigns the physical blocks 410(0)~410(N) as) a data area 502, a spare area 504, a system area 506, and a replacement area 508.

The physical blocks logically belonging to the data area 502 and the spare area 504 are used for storing data from the host system 1000. Specifically, the physical blocks (also referred to as data physical blocks) of the data area 502 are considered physical blocks already containing data, and physical blocks (also referred to as substitute physical blocks) in the spare area 504 are physical blocks used for writing new data. For instance, when a write command and data to be written are received from the host system 1000, the memory management circuit 302 selects a physical block from the spare area 504, organizes the data to be written into the selected physical block, and writes the data into the selected physical block. In addition, when a data merge operation is to be executed on a logical block, the memory management circuit 302 selects a physical block from the spare area 504 as a new data physical block corresponding to the logical block, reads the valid data belonging to the logical block from the rewritable non-volatile memory module 106, organizes the valid data, writes the organized valid data into the new data physical block, and re-maps the logical block to the new data physical block. To be more specific, after the data merge operation is completed, the memory management circuit 302 re-associates the data physical block storing the invalid data with the spare area 504, so as to perform a new data writing operation next time. For instance, when the physical block is associated with the spare area 504, or when the physical block is selected from the spare area 504, the memory management circuit 302 erases data in the physical block. Thereby, the selected physical block from the spare area 504 is a blank physical block for writing data.

The physical blocks logically belonging to the system area 506 are used for recording system data. For instance, the system data includes the manufacturers and models of the rewritable non-volatile memory module, the number of physical blocks in the rewritable non-volatile memory modules, the number of physical pages in each physical block, and so on.

Physical blocks logically belonging to the replacement area 508 are used in a bad physical block replacement procedure for replacing damaged physical blocks. Particularly, if there are still normal physical blocks in the replacement area 508, and a physical block of the data area 502 is damaged, the memory management circuit 302 selects a normal physical block from the replacement area 508 to replace the damaged physical block.

Based on the above, during the operation of the memory storage apparatus 100, the physical blocks associated with the data area 502, the spare area 504, the system area 506, and the replacement area 508 are dynamically changed. For instance, the physical blocks used for alternatively storing data are dynamically associated with the data area 502 or the spare area 504.

It should be mentioned that the memory management circuit 302 in the present exemplary embodiment manages the rewritable non-volatile memory module 106 in units of each physical block. However, the present invention is not limited thereto, and in another exemplary embodiment, the memory management circuit 302 may also group the physical blocks into a plurality of physical units and manage the rewritable non-volatile memory module 106 in units of each physical unit. Each physical unit may be constituted by at least one physical block in the same memory die or in different memory dies, for instance.

As shown in FIG. 4B, the memory management circuit 302 configures logical blocks 610(0)-610(H) for mapping to the physical blocks of the data area 502. Each of the logical blocks has a plurality of logical pages, and the logical pages are sequentially mapped to the physical pages in the corresponding data physical block. For instance, when the memory storage apparatus 100 is formatted, the logical blocks 610(0)-610(H) are initially mapped to the physical blocks 410(0)-410(F-1) of the data area 502.

In the present exemplary embodiment, the memory management circuit 302 maintains a logical block-physical block mapping table to record the mapping relationship between the logical blocks 610(0)-610(H) and the physical blocks of the data area 502. In addition, the host system 1000 accesses data in units of each logical access address. For instance, a logical access address is a logical sector. When the host system 1000 accesses data, the memory management circuit 302 converts the logical access addresses 710(0)-710(K) corresponding to the memory storage apparatus 100 into addresses in the corresponding logical pages. For instance, when the host system 1000 is about to access a logical access address, the memory management circuit 302 converts the logical access address accessed by the host system 1000 into a multi-dimensional address composed of the corresponding logical block, the corresponding logical page, and the corresponding logical offset, and the memory management circuit 202 accesses data in the corresponding physical page according to the logical block-physical block mapping table. Here, an offset is used to define a logical (or a physical) address in a logical page (or a physical page), and the offset is defined as the distance between the logical (or the physical) address and the starting address of the logical page (or the physical page), wherein the logical (or the physical) address is also referred to as a logical (or a physical) offset address.

Figure 5:
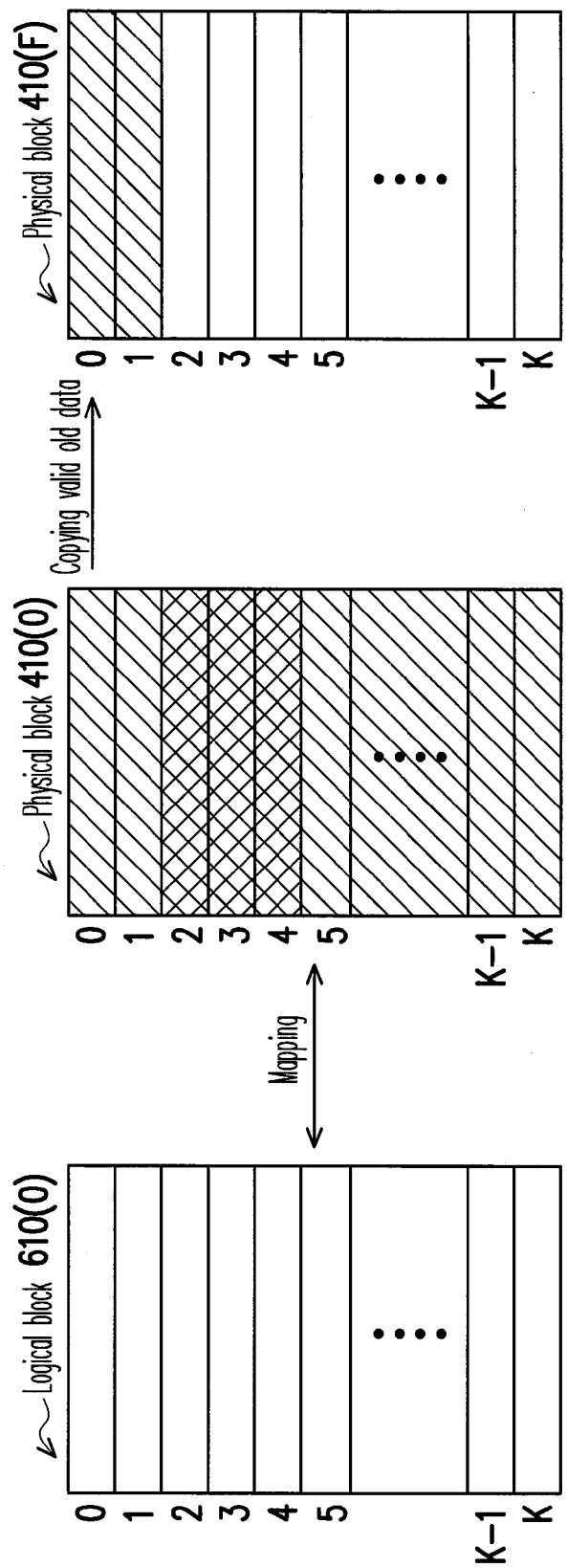
FIGS. 5-6 exemplarily illustrate an example of using a substitute physical block to write updated data according to the first exemplary embodiment of the present invention.
Figure 6:
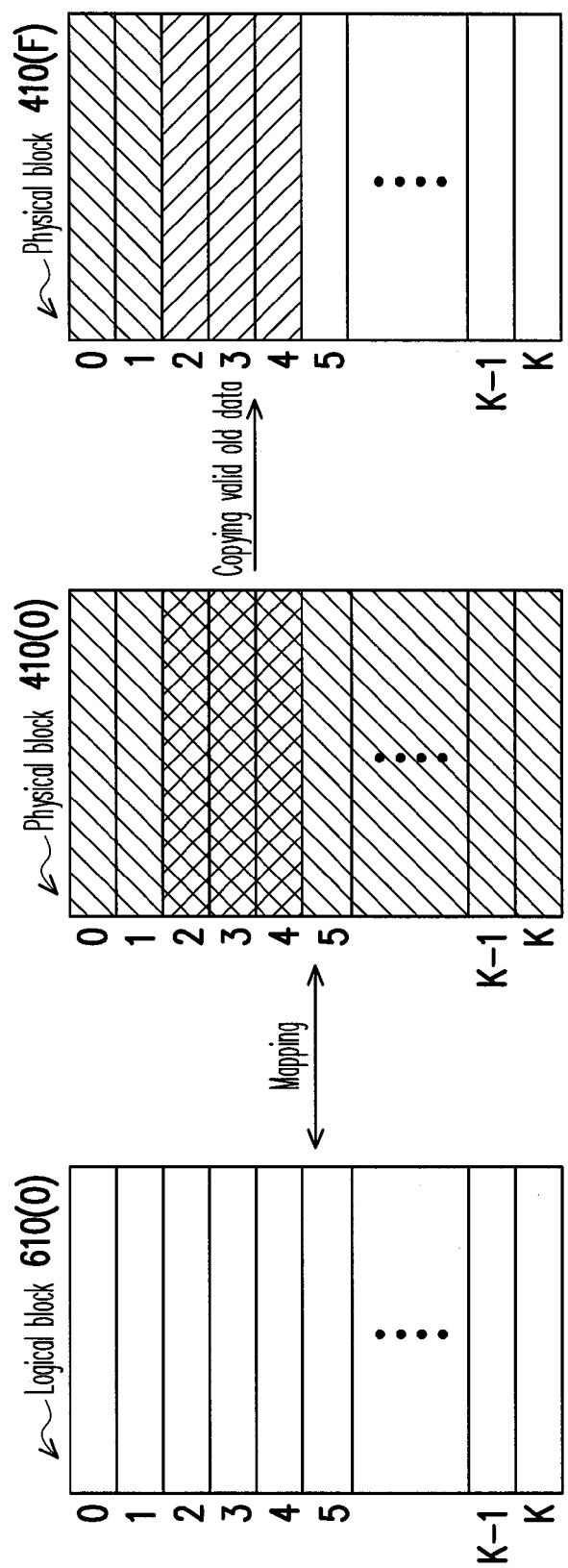

FIGS. 5-6 exemplarily illustrate an example of using a substitute physical block to write updated data according to the first exemplary embodiment of the present invention.

With reference to FIGS. 5-6, for instance, when the logical block 610(0) is currently mapped to the physical block 410(0), and the memory controller 104 receives a write command from the host system 1000 for writing updated data into the logical pages belonging to the logical block 610(0), the memory controller 104 identifies that the logical block 610(0) is currently mapped to the physical block 410(0) based on the logical block-physical block mapping table and selects the physical block 410(F) from the spare area 504 for writing the updated data. However, when the updated data is written into the physical block 410(F), the memory controller 104 does not instantly move all the valid data in the physical block 410(0) to the physical block 410(F) or erase the physical block 410(0). Specifically, the memory management circuit 302, from the physical block 410(0), reads the valid data before the physical page to be written (i.e., data in the $0^{th}$ physical page and the $1^{st}$ physical page of the physical block 410(0)). After that, the memory management circuit 302 writes the valid data (before the physical page to be written) into the $0^{th}$ physical page and the $1^{st}$ physical page of the physical block 410(F) (as shown in FIG. 5) and writes the new data into the $2^{nd}$ physical page to the $4^{th}$ physical page of the physical block 410(F) (as shown in FIG. 6). At this time, the memory controller 104 completes the writing operation. Since the valid data in the physical block 410(0) may become invalid during the next operation (e.g., a write command), instantly moving all the valid data in the physical block 410(0) to the physical block 410(F) may become meaningless. Additionally, because data must be written orderly into the physical pages of the physical block, the memory management circuit 302 only moves valid data (i.e., data stored in the $0^{th}$ physical page and the $1^{st}$ physical page of the physical block 410(0)) before the physical page to be written first and does not move other valid data (i.e., data stored in the $5^{th}$~$K^{th}$ physical pages of the physical block 410(0)). That is to say, the physical pages belonging to the physical blocks 410(0) and 410(F) sequentially map to logical pages belonging to the logical block 610(0).

In the present exemplary embodiment, the operation of maintaining such a temporary relationship is referred to as opening mother-child blocks. Besides, the original physical block (e.g., the physical block 410(0)) is referred to as a "mother physical block" or an "updated physical block", and the substitute physical block (e.g., the physical block 410(F)) for replacing the "mother physical block" is referred to as a "child physical block" or a "substitute physical block". Here, the mother physical block and the child physical block that store data belonging to the same logical block are collectively referred to as a mother-child block set.

It should be noted that the physical blocks of the spare area 504 is limited. Accordingly, during the operation of the memory storage apparatus 100, the number of the currently-opened mother-child block sets is limited as well. In other words, during the operation of the memory storage apparatus 100, the number of opened mother-child block sets cannot be greater than the threshold value of mother-child blocks. For instance, in this exemplary embodiment, the threshold value of mother-child blocks is set to 3, which should not be construed as a limitation to the present invention. As such, when the memory storage apparatus 100 receives a write command from the host system 1000, and the number of the opened mother-child block sets reaches the threshold value, the memory controller 104 must perform a data merge operation to close one of the opened mother-child block sets, and the memory controller 104 may then execute the write command. Specifically, during the data merge operation, the memory controller 104 combines the data in the mother physical block and the child physical block into one physical block.

Figure 7:
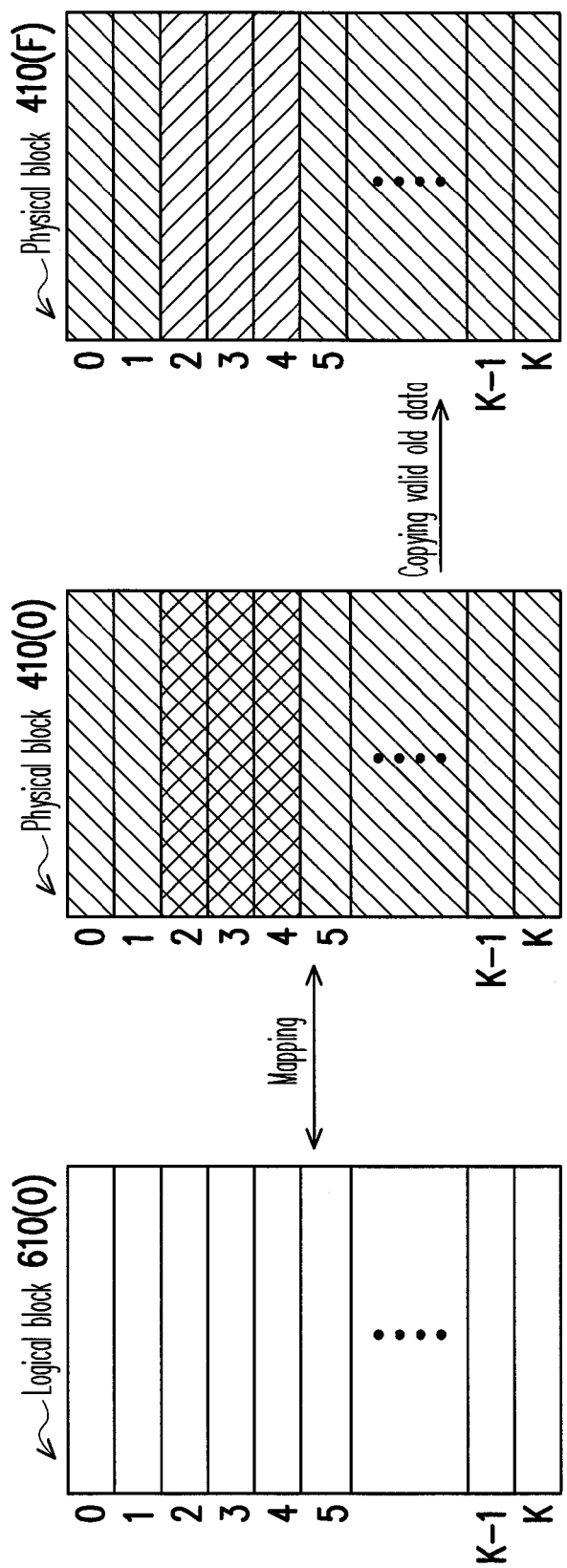
FIG. 7 exemplarily illustrates a data merge operation according to the first exemplary embodiment of the present invention.

FIG. 7 exemplarily illustrates a data merge operation according to the first exemplary embodiment of the present invention.

With reference to FIG. 7, when it is necessary to merge valid data in the physical blocks 410(0) and 410(F) shown in FIG. 6, the memory management circuit 302 reads the remaining valid data from the physical block 410(0) (i.e., data stored in the $5^{th}$~$K^{th}$ physical pages of the physical block 410(0)) and then writes the remaining valid data into the $5^{th}$~$K^{th}$ physical pages of the physical block 410(F). The memory management circuit 302 then associates the physical block 410(F) with the data area 502. Namely, the memory management circuit 302 re-maps the logical block 610(0) to the physical block 410(F) in the logical block-physical block mapping table. In addition, the memory management circuit 302 performs an erasing operation on the physical block 410(0) and associates the erased physical block 410(0) with the spare area 504. For instance, in the present exemplary embodiment, the memory management circuit 302 establishes a spare area physical block table (not shown) for recording the physical blocks currently associated with the spare area 504.

It should be mentioned that the programming rule of the rewritable non-volatile memory module requires data to be written from the start physical page to the last physical page of each physical block and each bit to be programmed only once (i.e., from "1" to "0"). Hence, once data belonging to a logical page is written into a physical page of a child physical block, and the host system 1000 intends to again write updated data into the logical page, data can no longer be written into the physical page of the child physical block. For instance, as shown in FIG. 6, when data belonging to the $0^{th}$ logical page of the logical block 610(0) is stored into a physical page of the child physical block 410(F) (the child physical block 410(F) corresponding to the mother physical block 410(0)), and the host system 100 intends to store updated data into the $0^{th}$ logical page of the logical block 610(0), the physical page (i.e., the $0^{th}$ physical page) mapped to the $0^{th}$ logical page of the logical bock 610(0) in the child physical block 410(F) can not be used for writing the updated data. According to the present exemplary embodiment of the present invention, the memory management circuit 302 may select one physical block from the spare area 504 as a reserved physical block that may be applied to all of the mother physical blocks. Particularly, when data belonging to a logical page of a logical block is stored in a physical page of a corresponding physical block, and the host system 1000 intends to store updated data into the logical page, the memory management circuit 302 independently assigns the reserved physical block to the mother physical block mapped to the logical block and writes the updated data into the reserved physical block. Even though one physical block is exemplified as the reserved physical block for all of the mother physical blocks according to the present exemplary embodiment, it should be understood that the present invention is not limited thereto. In another exemplary embodiment of the present invention, the number of reserved physical blocks for all of the mother physical blocks may be different from that described above. For instance, each of the mother physical blocks may be assigned with one physical block as the reserved physical block.

Figure 8A:
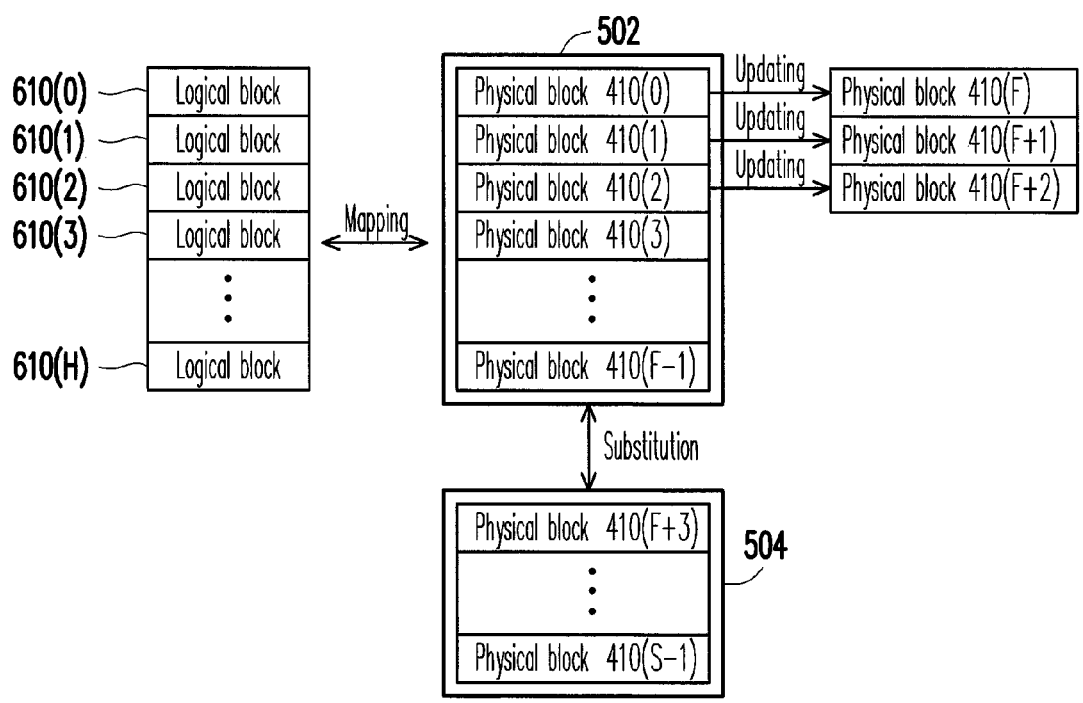
FIGS. 8A and 8B are schematic diagrams of configuring and assigning reserved physical blocks according to the first exemplary embodiment of the present invention.
Figure 8B:
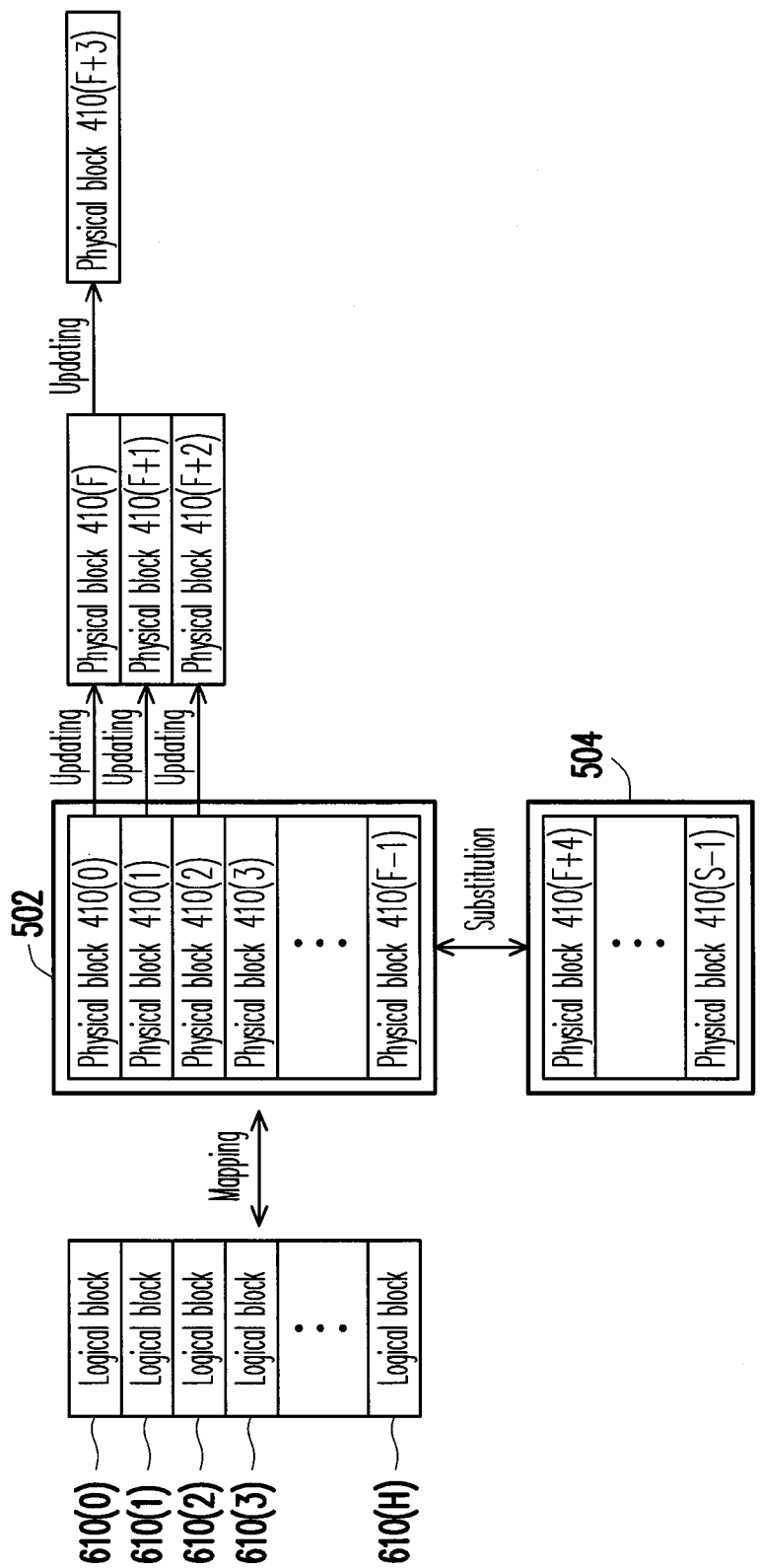

FIGS. 8A and 8B are schematic diagrams of configuring and assigning reserved physical blocks according to the first exemplary embodiment of the present invention.

With reference to FIG. 8A, in this example, it is assumed that the logical blocks 610(0)~610(H) sequentially map to the physical blocks 410(0)~410(F-1) belonging to the data area 502, and that the memory management circuit 302 performs an operation of "opening mother-child blocks" on the logical blocks 610(0)~610(2) (i.e., the operation shown in FIG. 5 to FIG. 6). Here, the physical block 410(F) is selected from the spare area 504 and serves as the child physical block corresponding to the physical block 410(0), the physical block 410(F+1) is selected from the spare area 504 and serves as the child physical block corresponding to the physical block 410(1), and the physical block 410(F+2) is selected from the spare area 504 and serves as the child physical block corresponding to the physical block 410(2). That is to say, valid data belonging to a portion of logical pages of the logical block 610(0) is written into the physical pages of the physical block 410(F), valid data belonging to a portion of logical pages of the logical block 610(1) is written into the physical pages of the physical block 410(F+1), and valid data belonging to a portion of logical pages of the logical block 610(2) is written into the physical pages of the physical block 410(F+2).

Specifically, the memory management circuit 302 may reserve one physical block in the spare area 504 (e.g., the physical block 410(F+3)) as a reserved physical block for mother physical blocks (i.e., the physical blocks 410(0)~410(2)).

To be more specific, during the operation of the memory storage apparatus 100, data is programmed in units of each physical page in the rewritable non-volatile memory module 106, and thus the memory management circuit 302 is also likely to select the physical blocks from the spare area 504 for other purposes. For instance, the memory management circuit 302 may select one physical block from the spare area 504 as a temporary physical block that stores updated data having a size less than the capacity of one physical page. Namely, the memory management circuit 302 determines whether the size of the updated data is less than the capacity of one physical page; if yes, the updated data is temporarily stored into a physical block (e.g., the physical block 410(S−1)) selected from the spare area 504. Then, pieces of small data having the size less than the capacity of one physical page is merged to data belonging to one physical page and written to the child physical block. Therefore, in the present exemplary embodiment of the present invention, the memory management circuit 302 may monitor the number of physical blocks in the spare area 504 and reserve at least one physical block in the spare area 504 as the reserved physical block.

As shown in FIG. 8B, if the host system 1000 intends to store updated data into a logical page of the logical block 610(0) and a physical page mapped to the logical page in the child physical block 410(F) has stored data, the memory management circuit 302 independently assigns the reserved physical block (i.e., the physical block 410(F+3)) to the mother physical block 410(0) and writes the updated data into the reserved physical block 410(F+3).

In the exemplary embodiment, when the reserved physical block is assigned to a mother physical block, the memory management circuit 302 merely writes the data that belongs to the logical block mapped to the mother physical block into the reserved physical block. In particular, the memory management circuit 302 sequentially maps the physical pages of the reserved physical block to the logical pages of the logical block and writes the data belonging to the logical block.

Figure 9:
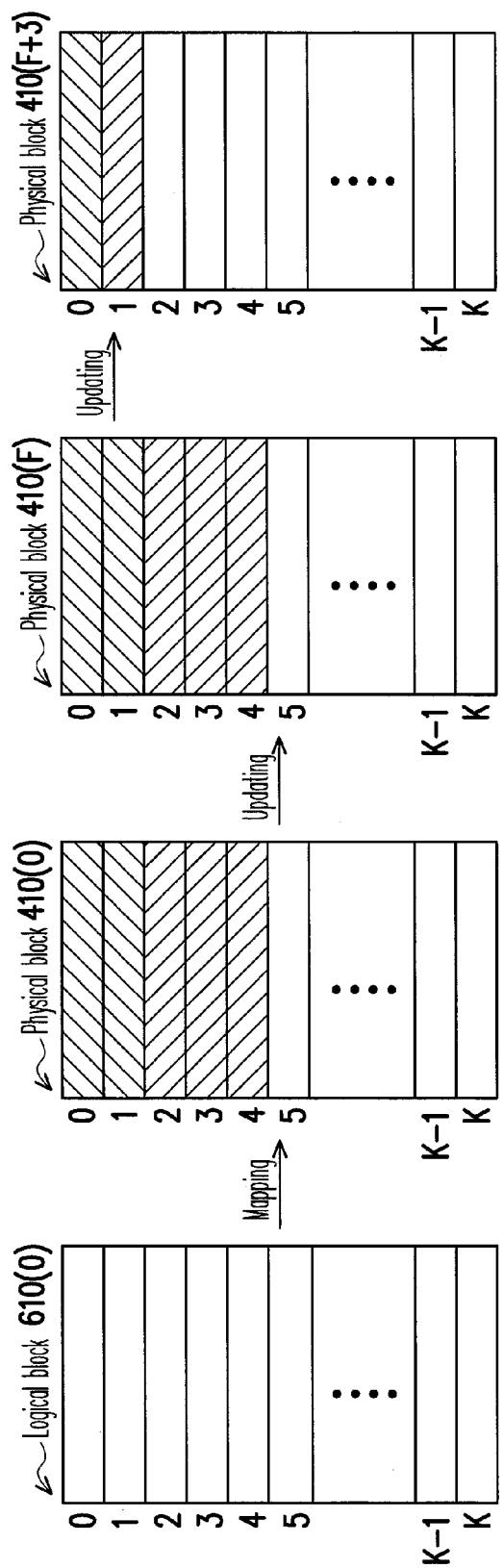
FIG. 9 exemplarily illustrates an example of using the reserved physical block to write updated data according to the first exemplary embodiment of the present invention.

FIG. 9 exemplarily illustrates an example of using the reserved physical block to write updated data according to the first exemplary embodiment of the present invention.

With reference to FIG. 9, when data belonging to the $0^{th}$~$4^{th}$ logical pages of the logical block 610(0) is stored into physical pages of the child physical block 410(F) (as shown in FIG. 6), and the host system 100 intends to store the next updated data into the $1^{st}$ logical page of the logical block 610(0), the memory management circuit 302 assigns the reserved physical block 410(F+3) to the physical block 410(0), copies valid data belonging to the $0^{th}$ logical page of the logical block 610(0) from the $0^{th}$ physical page of the physical block 410(F) to the $0^{th}$ physical page of the physical block 410(F+3), and writes the updated data belonging to the $1^{st}$ logical page of the logical block 610(0) into the $1^{st}$ physical page of the physical block 410(F+3).

That is to say, after assigning the reserved physical block, the memory management circuit 302 sequentially maps the physical pages of the reserved physical block to logical pages of a logical block and writes the data belonging to the logical block. The reserved physical block may merely be assigned to one mother physical block and may be operated as an additional child physical block corresponding to the mother physical block.

After all the valid data belonging to a logical block is written into the reserved physical block, the memory management circuit 302 re-maps the logical block to the reserved physical block in the logical block-physical block mapping table (i.e., the reserved physical block is associated with the data area 502), performs an erasing operation on the mother physical block mapped to the logical block and the corresponding child physical block, and associates the erased physical block with the spare area 504. The memory management circuit 302 then selects a blank physical block as a new reserved physical block from the spare area 504.

For instance, as shown in FIG. 9, if the host system 1000 sequentially stores updated data into the $2^{nd}$~$K^{th}$ logical pages of the logical block 610(0), the memory management circuit 302 directly re-maps the logical block 610(0) to the physical block 410(F+3) and performs an erasing operation on the physical blocks 410(0) and 410(F). When it is necessary to perform a data merge operation, for instance, other valid data belonging to the logical block 610(0) (i.e., the data belonging to the $2^{nd}$~$K^{th}$ logical pages of the logical block 610(0)) is moved from the physical block 410(0) or the physical block 410(F) to the physical block 410(F+3), and the logical block 610(0) is re-mapped to the physical block 410(F+3). Namely, the reserved physical block is associated with the data area 504 and becomes a physical block mapped to the logical block 610(0). Besides, an erasing operation is performed on the physical blocks 410(0) and 410(F), and the erased physical blocks 410(0) and 410(F) are associated with the spare area.

Figure 10:
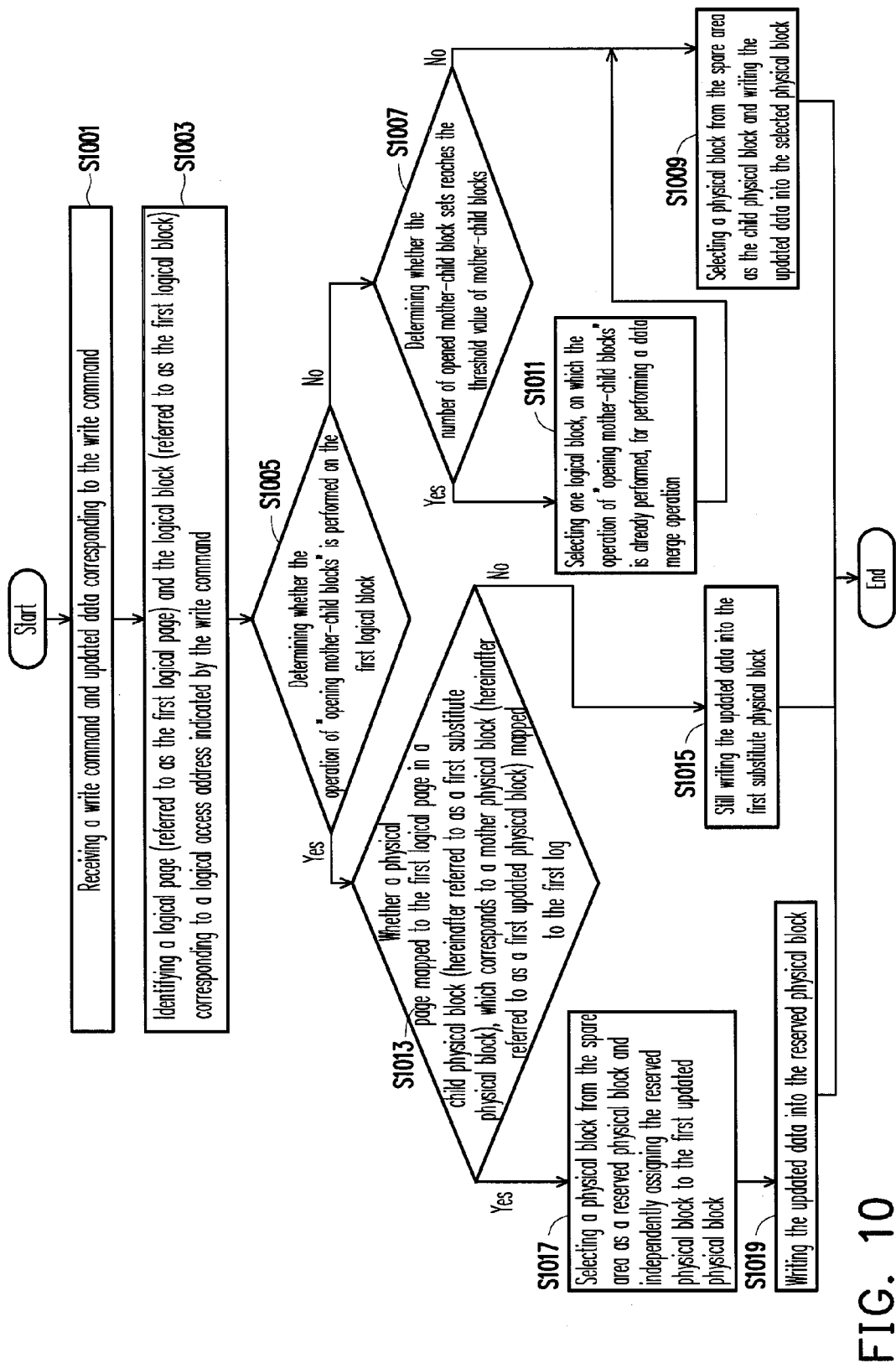
FIG. 10 is a flowchart illustrating a data writing method according to the first embodiment of the present invention.

FIG. 10 is a flowchart illustrating a data writing method according to the first embodiment of the present invention.

With reference to FIG. 10, in step S1001, the memory management circuit 302 receives a write command and updated data corresponding to the write command from the host system 1000.

In step S1003, the memory management circuit 302 identifies a logical page (hereinafter referred to as the first logical page) and a logical block (hereinafter referred to as the first logical block) corresponding to a logical access address indicated by the write command. In step S1005, the memory management circuit 302 determines whether the operation of "opening mother-child blocks" is performed on the first logical block.

If the operation of "opening mother-child blocks" is not performed on the first logical block, in step S1007, the memory management circuit 302 determines whether the number of opened mother-child block sets reaches the threshold value of mother-child blocks. If the number of opened mother-child block sets does not reach the threshold value of mother-child blocks, in step S1009, the memory management circuit 302 selects a physical block from the spare area 504 as the child physical block and writes the updated data into the selected physical block. If the number of opened mother-child block sets reaches the threshold value of mother-child blocks, in step S1011, the memory management circuit 302 selects one logical block, on which the operation of "opening mother-child blocks" is already performed, for performing a data merge operation. After step S1011 is performed, the step S1009 is carried out. The method for writing updated data into the child physical block is described above with reference to FIG. 5 and FIG. 6, and the method for performing a data merge operation is elaborated above with reference to FIG. 7. Therefore, no relevant descriptions are given here.

If the operation of "opening mother-child blocks" is performed on the first logical block, in step S1013, the memory management circuit 302 determines whether a physical page mapped to the first logical page in a child physical block (hereinafter referred to as a first substitute physical block), which corresponds to a mother physical block (hereinafter referred to as a first updated physical block) mapped to the first logical block, stores data. If the physical page mapped to the first logical page in the first substitute physical block does not store the data, in step S1015, the memory management circuit 302 still writes the updated data into the first substitute physical block. If the physical page mapped to the first logical page in the first substitute physical block stores the data, in step S1017, the memory management circuit 302 selects a physical block from the spare area 504 as a reserved physical block and independently assigns the reserved physical block to the first updated physical block. In step S1019, the memory management circuit 302 writes the updated data into the reserved physical block. The method for writing the updated data into the reserved physical block is described above with reference to FIG. 9; therefore, no relevant descriptions are given hereinafter.

In another exemplary embodiment, after step S1019, the memory management circuit 302 may further move other valid data belonging to the first logical block to the reserved physical block and re-map the first logical block to the reserved physical block. The memory management circuit 302 may then perform an erasing operation on the first updated physical block and the first substitute physical block and associate the erased physical blocks with the spare area 504. Note that the memory management circuit 302 may further move other valid data belonging to the first logical block to the reserved physical block, re-map the first logical block to the reserved physical block, and erase the physical blocks when the write command is again executed.

Besides, in another exemplary embodiment, after step S1019, the memory management circuit 302 may further determine whether the reserved physical block is fully written. If the reserved physical block is fully written, the memory management circuit 302 further re-maps the first logical block to the reserved physical block, performs an erasing operation on the first updated physical block and the first substitute physical block, and associates the erased physical blocks with the spare area 504.

Second Exemplary Embodiment

Here, hardware structures of the second exemplary embodiment and the first exemplary embodiment are similar, while the difference therebetween is the timing at which the updated data is written into the reserved physical block. Specifically, on the condition that the operation of "opening mother-child blocks" is performed on a logical block where the updated data is to be stored, and a physical page mapped to the logical page in a child physical block, which corresponds to a mother physical block mapped to the logical block that the logical page belongs to, has stored data, the memory management circuit described in the first exemplary embodiment assigns the reserved physical block and writes the updated data into the reserved physical block. However, in the second exemplary embodiment, when the operation of "opening mother-child blocks" is performed on the logical block where the updated data is to be stored, the memory management circuit determines whether a logical page where the updated data is to be written is a start logical page of the logical block and whether the size of the updated data is equal to the capacity of one physical block. Only when the logical page where the updated data is to be written is the start logical page of the logical block and the size of the updated data is equal to the capacity of one physical block, the memory management circuit writes the updated data into the reserved physical block. Differences between the second exemplary embodiment and the first exemplary embodiment are described below.

Figure 11:
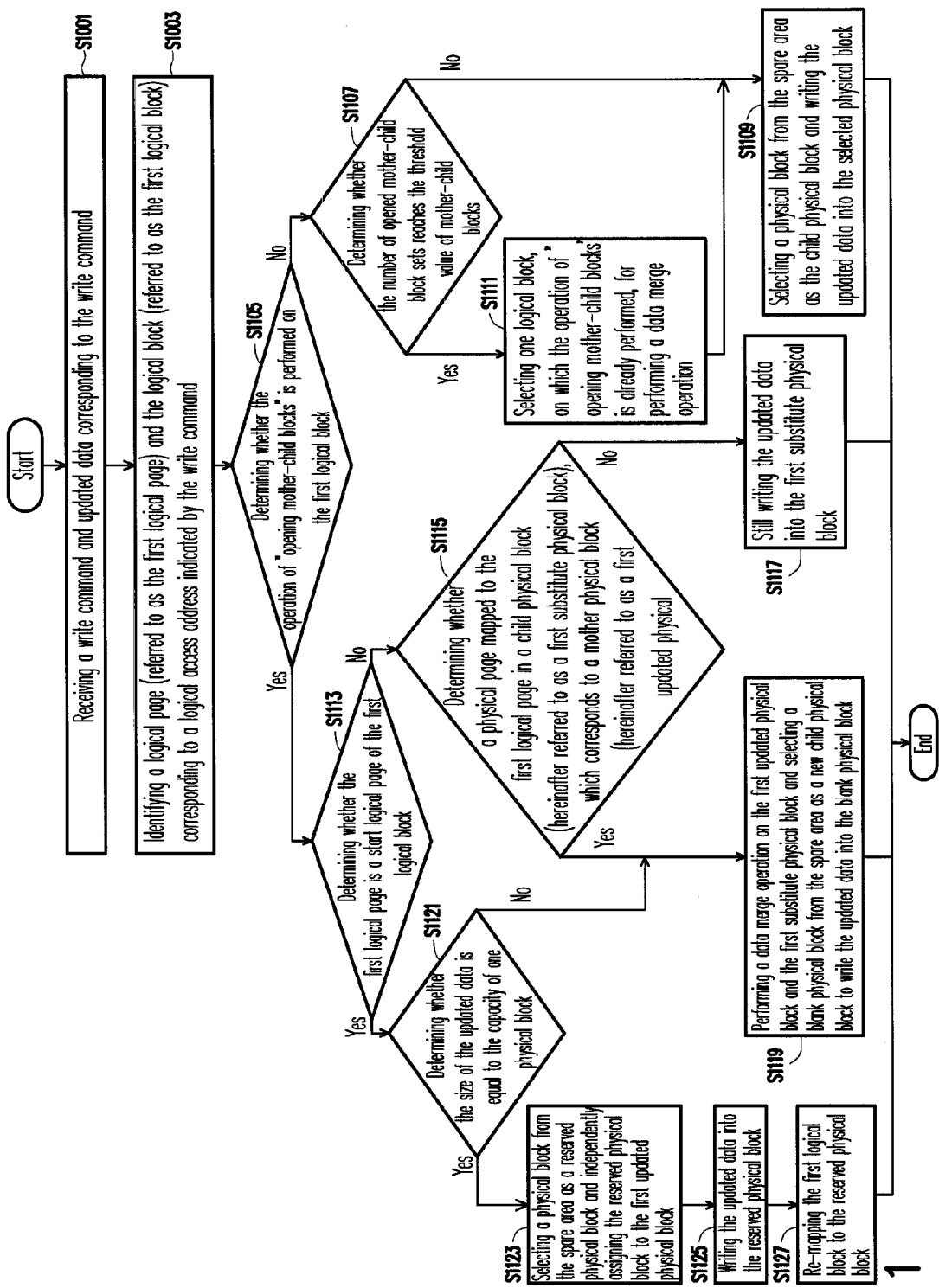
FIG. 11 is a flowchart illustrating a data writing method according to a second exemplary embodiment of the present invention.

FIG. 11 is a flowchart illustrating a data writing method according to a second exemplary embodiment of the present invention.

With reference to FIG. 11, in step S1101, the memory management circuit 302 receives a write command and updated data corresponding to the write command from the host system 1000.

In step S1103, the memory management circuit 302 identifies the logical page (hereinafter referred to as the first logical page) and the logical block (hereinafter referred to as the first logical block) corresponding to the logical access address indicated by the write command. In step S1105, the memory management circuit 302 determines whether the operation of "opening mother-child blocks" is performed on the first logical block.

If the operation of "opening mother-child blocks" is not performed on the first logical block, in step S1107, the memory management circuit 302 determines whether the number of opened mother-child block sets reaches the threshold value of mother-child blocks. If the number of opened mother-child block sets does not reach the threshold value of mother-child blocks, in step S1109, the memory management circuit 302 selects a physical block from the spare area 504 as the child physical block and writes the updated data into the selected physical block. If the number of opened mother-child block sets reaches the threshold value of mother-child blocks, in step S1111, the memory management circuit 302 selects one logical block, on which the operation of "opening mother-child blocks" is already performed, for performing a data merge operation. After step S1111 is performed, the step S1109 is carried out. The method for writing updated data into the child physical block is described above with reference to FIG. 5 and FIG. 6, and the method for performing a data merge operation is elaborated above with reference to FIG. 7. Therefore, no relevant descriptions are given hereinafter.

If the operation of "opening mother-child blocks" is not performed on the first logical block, in step S1113, the memory management circuit 302 determines whether the first logical page is a start logical page of the first logical block. Specifically, the memory management circuit 302 determines whether the first logical page is the $0^{th}$ logical page of the first logical block.

If the first logical page is not the start logical page of the first logical block, in step S1115, the memory management circuit 302 determines whether a physical page mapped to the first logical page in a child physical block (hereinafter referred to as a first substitute physical block), which corresponds to a mother physical block (hereinafter referred to as a first updated physical block) mapped to the first logical block, stores data. If the physical page mapped to the first logical page in the first substitute physical block does not store the data, in step S1117, the memory management circuit 302 still writes the updated data into the first substitute physical block. If the physical page mapped to the first logical page in the first substitute physical block stores the data, in step S1119, the memory management circuit 302 performs a data merge operation on the first updated physical block and the first substitute physical block (as shown in FIG. 7) and selects a blank physical block from the spare area 504 as a new child physical block to write the updated data into the blank physical block (as shown in FIGS. 5-6).

If the first logical page is the start logical page belonging to the first logical block, in step S1121, the memory management circuit 302 further determines whether the size of the updated data is equal to the capacity of one physical block. For instance, the host system 100 transmits the updated data to be stored into the memory storage apparatus 100 in units of each sector, and the updated data is temporarily stored into the buffer memory 308. Specifically, after receiving all of the updated data corresponding to the current write command, the memory management circuit 302 determines whether the size of the updated data corresponding to the current write command is equal to the capacity of one physical block.

If the size of the updated data is not equal to the capacity of one physical block, step S1119 is performed.

If the size of the updated data is equal to the capacity of one physical block, in step S1123, the memory management circuit 302 selects a physical block from the spare area 504 as a reserved physical block and independently assigns the reserved physical block to the first updated physical block. In step S1125, the memory management circuit 302 writes the updated data into the reserved physical block. In step S1127, the memory management circuit 302 re-maps the first logical block to the reserved physical block, performs an erasing operation on the first updated physical block and the first substitute physical block, and associates the erased physical blocks with the spare area 504.

In light of the foregoing, according to the data writing method, the memory controller, and the memory storage apparatus described in the exemplary embodiments of the present invention, the updated physical block additionally has the reserved physical block. When it is unlikely to write the updated data into the substitute physical block, the updated data is written into the reserved physical block, so as to prevent the data merge operation and reduce the time required for executing the write command. Moreover, according to another exemplary embodiment of the present invention, on the condition that the operation of "opening mother-child blocks" is performed on a logical block, and the updated data is to be stored in all logical pages of the logical block, the updated data is directly written into the reserved physical block, so as to prevent the data merge operation and reduce the time required for executing the write command. The previously described exemplary embodiments of the present invention have the advantages aforementioned, wherein the advantages aforementioned not required in all versions of the invention.

Although the present invention has been described with reference to the above embodiments, it will be apparent to one of the ordinary skill in the art that modifications to the described embodiment may be made without departing from the spirit of the present invention. Accordingly, the scope of the present invention will be defined by the attached claims not by the above detailed descriptions.

What is claimed is:

1. A data writing method for a rewritable non-volatile memory module, wherein the rewritable non-volatile memory module has a plurality of physical blocks, each of the physical blocks has a plurality of physical pages, the physical blocks are grouped into at least a data area and a spare area, a plurality of logical blocks is configured to map to the physical blocks belonging to the data area, each of the logical blocks has a plurality of logical pages, a plurality of physical blocks are respectively selected from the spare area as a plurality of substitute physical blocks corresponding to a plurality of updated physical blocks among the physical blocks belonging to the data area, and the data writing method comprises:
    selecting at least one physical block from the spare area as a reserved physical block for the updated physical blocks;
    receiving a write command and updated data corresponding to the write command from a host system, wherein the write command indicates to write the updated data starting from a first logical page among the logical pages, the first logical page belongs to a first logical block among the logical blocks, and the first logical block maps to a first updated physical block among the updated physical blocks;
    determining whether a first substitute physical block corresponding to the first updated physical block stores data belonging to the first logical page; and
    when the first substitute physical block stores the data belonging to the first logical page, independently assigning the reserved physical block to the first updated physical block and writing the updated data into the reserved physical block,
    wherein the reserved physical block only stores data belonging to the same logical block.

2. The data writing method as recited in claim 1 further comprising:
    when the first substitute physical block does not store the data belonging to the first logical page, writing the updated data into the first substitute physical block corresponding to the first updated physical block.

3. The data writing method as recited in claim 1 further comprising:
    selecting one physical block from the spare area as a temporary physical block corresponding to the first updated physical block; and
    temporarily storing data belonging to the first logical block and having a size less than a capacity of one physical page into the temporary physical block.

4. The data writing method as recited in claim 1 further comprising:
    after independently assigning the reserved physical block to the first updated physical block and writing the updated data into the reserved physical block, performing following steps:
    re-mapping the first logical block to the reserved physical block to associate the reserved physical block with the data area; and
    performing an erasing operation on the first updated physical block and the first substitute physical block and associating the erased first updated physical block and the erased first substitute physical block with the spare area.

5. The data writing method as recited in claim 1 further comprising:
    when the first substitute physical block stores the data belonging to the first logical page, performing following steps:
    copying valid data belonging to the first logical block into the reserved physical block from the first updated physical block and the first substitute physical block;
    re-mapping the first logical block to the reserved physical block to associate the reserved physical block with the data area; and
    performing an erasing operation on the first updated physical block and the first substitute physical block and associating the erased first updated physical block and the erased first substitute physical block with the spare area.

6. A data writing method for a rewritable non-volatile memory module, wherein the rewritable non-volatile memory module has a plurality of physical blocks, each of the physical blocks has a plurality of physical pages, the physical blocks are grouped into at least a data area and a spare area, a plurality of logical blocks is configured to map to the physical blocks belonging to the data area, each of the logical blocks has a plurality of logical pages, a plurality of physical blocks are respectively selected from the spare area as a plurality of substitute physical blocks corresponding to a plurality of updated physical blocks among the physical blocks belonging to the data area, and the data writing method comprises:

selecting at least one physical block from the spare area as a reserved physical block for the updated physical blocks;

receiving a write command and updated data corresponding to the write command from a host system, wherein the write command indicates to write the updated data starting from a first logical page among the logical pages, the first logical page belongs to a first logical block among the logical blocks, and the first logical block maps to a first updated physical block among the updated physical blocks;

determining whether the first logical page is a start logical page of the first logical block;

when the first logical page is the start logical page of the first logical block, determining whether a size of the updated data is equal to a capacity of one physical block; and when the size of the updated data is equal to the capacity of one physical block, independently assigning the reserved physical block to the first updated physical block and writing the updated data into the reserved physical block, wherein the reserved physical block only stores data belonging to the same logical block.

7. The data writing method as recited in claim 6 further comprising:

when the size of the updated data is not equal to the capacity of one physical block, performing a data merge operation on the first updated physical block, selecting a blank physical block from the spare area and writing the updated data into the selected blank physical block.

8. The data writing method as recited in claim 6 further comprising:

when the first logical page is not the start logical page belonging to the first logical block, determining whether a physical page mapped to the first logical page in a first substitute physical block corresponding to the first updated physical block stores data;

when the physical page mapped to the first logical page in the first substitute physical block does not store the data, writing the updated data into the first substitute physical block corresponding to the first updated physical block; and when the physical page mapped to the first logical page in the first substitute physical block stores the data, performing a data merge operation on the first updated physical block, selecting a blank physical block from the spare area and writing the updated data into the selected blank physical block.

9. The data writing method as recited in claim 6 further comprising:

selecting a physical block from the spare area as a temporary physical block corresponding to the first updated physical block; and temporarily storing data belonging to the first logical block and having a size less than a capacity of one physical page into the temporary physical block.

10. The data writing method as recited in claim 6 further comprising:

after independently assigning the reserved physical block to the first updated physical block and writing the updated data into the reserved physical block, performing following steps:

re-mapping the first logical block to the reserved physical block to associate the reserved physical block with the data area; and performing an erasing operation on the first updated physical block and the first substitute physical block and associating the erased first updated physical block and the erased first substitute physical block with the spare area.

11. A memory controller for controlling a rewritable non-volatile memory module, wherein the rewritable non-volatile memory module has a plurality of physical blocks, and each of the physical blocks has a plurality of physical pages, the memory controller comprising:

a host interface, configured to be coupled to a host system;

a memory interface, configured to be coupled to the rewritable non-volatile memory module; and a memory management circuit, coupled to the host interface and the memory interface, and configured to group the physical blocks into at least a data area and a spare area, wherein the memory management circuit configures a plurality of logical blocks for mapping to the physical blocks belonging to the data area, and each of the logical blocks has a plurality of logical pages, wherein the memory management circuit respectively selects a plurality of the physical blocks from the spare area as a plurality of substitute physical blocks corresponding to a plurality of updated physical blocks among the physical blocks belonging to the data area, wherein the memory management circuit selects at least one physical block from the spare area as a reserved physical block for the updated physical blocks, wherein the memory management circuit receives a write command and updated data corresponding to the write command from the host system, wherein the write command indicates to write the updated data starting from a first logical page among the logical pages, the first logical page belongs to a first logical block among the logical blocks, and the first logical block maps to a first updated physical block among the updated physical blocks, wherein the memory management circuit determines whether a first substitute physical block among the substitute physical blocks stores data belonging to the first logical page, wherein the first substitute physical block corresponds to the first updated physical block, wherein when the first substitute physical block stores the data belonging to the first logical page, the memory management circuit independently assigns the reserved physical block to the first updated physical block and writes the updated data into the reserved physical block, wherein the reserved physical block only stores data belonging to the same logical block.

12. The memory controller as recited in claim 11, wherein when the first substitute physical block does not store the data belonging to the first logical page, the memory management circuit writes the updated data into the first substitute physical block corresponding to the first updated physical block.

13. The memory controller as recited in claim 11, wherein the memory management circuit selects one physical block from the spare area as a temporary physical block corresponding to the first updated physical block and temporarily stores data belonging to the first logical block and having a size less than a capacity of one physical page into the temporary physical block.

14. A memory controller for controlling a rewritable non-volatile memory module, wherein the rewritable non-volatile memory module has a plurality of physical blocks, and each of the physical blocks has a plurality of physical pages, the memory controller comprising:

a host interface, configured to be coupled to a host system;

a memory interface, configured to be coupled to the rewritable non-volatile memory module; and a memory management circuit, coupled to the host interface and the memory interface, and configured to group the physical blocks into at least a data area and a spare area, wherein the memory management circuit configures a plurality of logical blocks for mapping to the physical blocks belonging to the data area, and each of the logical blocks has a plurality of logical pages, wherein the memory management circuit respectively selects a plurality of physical blocks from the spare area as a plurality of substitute physical blocks corresponding to a plurality of updated physical blocks among the physical blocks belonging to the data area, wherein the memory management circuit selects at least one physical block from the spare area as a reserved physical block for the updated physical blocks, wherein the memory management circuit receives a write command and updated data corresponding to the write command from the host system, wherein the write command indicates to write the updated data starting from a first logical page among the logical pages, the first logical page belongs to a first logical block among the logical blocks, and the first logical block maps to a first updated physical block among the updated physical blocks, wherein the memory management circuit determines whether a first substitute physical block corresponding to the first updated physical block stores data belonging to the first logical page, wherein when the first substitute physical block stores the data belonging to the first logical page, the memory management circuit determines whether the first logical page is a start logical page of the first logical block, wherein when the first logical page is the start logical page of the first logical block, the memory management circuit determines whether a size of the updated data is equal to a capacity of one physical block, wherein when the size of the updated data is equal to the capacity of one physical block, the memory management circuit independently assigns the reserved physical block to the first updated physical block and writes the updated data into the reserved physical block, wherein the reserved physical block only stores data belonging to the same logical block.

15. The memory controller as recited in claim 14, wherein when the size of the updated data is not equal to the capacity of one physical block, the memory management circuit performs a data merge operation on the first updated physical block, selects a blank physical block from the spare area and writes the updated data into the selected blank physical block.

16. The memory controller as recited in claim 14, wherein when the first logical page is not the start logical page of the first logical block, the memory management circuit determines whether a physical page mapped to the first logical page in the first substitute physical block stores data, wherein when the physical page mapped to the first logical page in the first substitute physical block does not store the data, the memory management circuit writes the updated data into the first substitute physical block corresponding to the first updated physical block, wherein when the physical page mapped to the first logical page in the first substitute physical block stores the data, the memory management circuit performs a data merge operation on the first updated physical block, selects a blank physical block from the spare area and writes the updated data into the selected blank physical block.

17. The memory controller as recited in claim 14, wherein the memory management circuit selects one physical block from the spare area as a temporary physical block corresponding to the first updated physical block and temporarily stores data belonging to the first logical block and having a size less than a capacity of one physical page into the temporary physical block.

18. A memory storage apparatus comprising:

a connector, configured to be coupled to a host system;

a rewritable non-volatile memory module, having a plurality of physical blocks, wherein each of the physical blocks has a plurality of physical pages; and a memory controller, coupled to the connector and the rewritable non-volatile memory module, and configured to group the physical blocks into at least a data area and a spare area, wherein memory controller configures a plurality of logical blocks for mapping to the physical blocks belonging to the data area, and each of the logical blocks has a plurality of logical pages, wherein the memory controller respectively selects a plurality of physical blocks from the spare area as a plurality of substitute physical blocks corresponding to a plurality of updated physical blocks among the physical blocks belonging to the data area, wherein the memory controller selects at least one physical block from the spare area as a reserved physical block for the updated physical blocks, wherein the memory controller receives a write command and updated data corresponding to the write command from the host system, wherein the write command indicates to write the updated data starting from a first logical page among the logical pages, the first logical page belongs to a first logical block among the logical blocks, and the first logical block maps to a first updated physical block among the updated physical blocks, wherein the memory controller determines whether a first substitute physical block corresponding to the first updated physical block stores data belonging to the first logical page, wherein when the first substitute physical block stores the data belonging to the first logical page, the memory controller independently assigns the reserved physical block to the first updated physical block and writes the updated data into the reserved physical block, wherein the reserved physical block only stores data belonging to the same logical block.

19. The memory storage apparatus as recited in claim 18, wherein when the first substitute physical block does not store the data belonging to the first logical page, the memory controller writes the updated data into the first substitute physical block corresponding to the first updated physical block.

20. The memory storage apparatus as recited in claim 18, wherein the memory controller selects one physical block from the spare area as a temporary physical block corresponding to the first updated physical block and temporarily stores data belonging to the first logical block and having a size less than the capacity of the physical page into the temporary physical block.

21. A memory storage apparatus comprising:
a connector, configured to be coupled to a host system;
a rewritable non-volatile memory module, having a plurality of physical blocks, wherein each of the physical blocks has a plurality of physical pages; and
a memory controller, coupled to the connector and the rewritable non-volatile memory module, and configured to group the physical blocks into at least a data area and a spare area,
wherein the memory controller configures a plurality of logical blocks for mapping to the physical blocks belonging to the data area, and each of the logical blocks has a plurality of logical pages,
wherein the memory controller respectively selects a plurality of physical blocks from the spare area as a plurality of substitute physical blocks corresponding to a plurality of updated physical blocks among the physical blocks belonging to the data area,
wherein the memory controller selects at least one physical block from the spare area as a reserved physical block for the updated physical blocks,
wherein the memory controller receives a write command and updated data corresponding to the write command from the host system,
wherein the write command indicates to write the updated data starting from a first logical page among the logical pages, the first logical page belongs to a first logical block among the logical blocks, and the first logical block maps to a first updated physical block among the updated physical blocks,
wherein the memory controller determines whether a first substitute physical block corresponding to the first updated physical block stores data belonging to the first logical page,
wherein when the first substitute physical block stores the data belonging to the first logical page, the memory controller determines whether the first logical page is a start logical page of the first logical block,
wherein when the first logical page is the start logical page of the first logical block, the memory controller determines whether a size of the updated data is equal to a capacity of one physical block,
wherein when the size of the updated data is equal to the capacity of one physical block, the memory controller independently assigns the reserved physical block to the first updated physical block and writes the updated data into the reserved physical block,
wherein the reserved physical block only stores data belonging to the same logical block.

22. The memory storage apparatus as recited in claim 21, wherein when the size of the updated data is not equal to the capacity of one physical block, the memory controller performs a data merge operation on the first updated physical block, selects a blank physical block from the spare area and writes the updated data into the selected blank physical block.

23. The memory storage apparatus as recited in claim 21, wherein when the first logical page is not the start logical page belonging to the first logical block, the memory controller determines whether a physical page mapped to the first logical page in the first substitute physical block stores data,
wherein when the physical page mapped to the first logical page in the first substitute physical block does not store the data, the memory controller writes the updated data into the first substitute physical block corresponding to the first updated physical block,
wherein when the physical page mapped to the first logical page in the first substitute physical block stores the data, the memory controller performs a data merge operation on the first updated physical block, selects a blank physical block among the physical blocks from the spare area and writes the updated data into the selected blank physical block.

24. The memory storage apparatus as recited in claim 21, wherein the memory controller selects a physical blocks from the spare area as a temporary physical block corresponding to the first updated physical block and temporarily stores data belonging to the first logical block and having a size less than a capacity of one physical page into the temporary physical block.

\* \* \* \* \*